United States Patent Office 3,297,744
Patented Jan. 10, 1967

---

3,297,744
PROCESS FOR THE MANUFACTURE OF β-CYANO-ETHYL-CHLOROALKYL ETHERS
Klaus Artz, Muttenz, and Paul Rhyner, Basel, Switzerland, assignors to Ciba Limited, Basel, Switzerland, a Swiss company
No Drawing. Filed Apr. 30, 1964, Ser. No. 364,026
Claims priority, application Switzerland, May 21, 1963, 6,376/63
6 Claims. (Cl. 260—465.6)

German specification 743,224 issued December 31, 1943, to I.G. Farbenindustrie AG., Frankfurt am Main, Germany, describes a process for the manufacture of β-cyanoethyl-chloroalkyl ethers by adding acrylonitrile on to chloroalcohols in the presence of an alkaline agent. In the sole working example, the reaction of 160 parts of ethylenechlorohydrin with 106 parts of acrylonitrile in the presence of 10 parts of a 40% aqueous sodium hydroxide solution is described; the maximum yield obtained by the said process is 25%.

The present invention provides a process for the manufacture of β-cyanoethyl halogenoalkyl ethers, which comprised reacting a halogenalcohol with acryonitrile at a temperature not greater than 40° C. in the presence of an alkali metal hydroxide, the amount of alkali metal hydroxide used per mol of halogenalcohol being at least 0.05 mol preferably at least 0.15 mol of solid alkali metal hydroxide.

As halogenalcohols, there are preferably used in the present process lower aliphatic chloroalcohols, especially ethylenechlorohydrin. Furthermore, the following suitable compounds may be mentioned:

ClCH₂CH₂OH

or

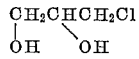

The reactants are advantageously used in equimolecular amounts. As alkali metal hydroxides there may be used, for example, potassium hydroxide or especially sodium hydroxide. The alkali metal hydroxide is advantageously added to the mixture of the reactants in successive portions.

The reaction is strongly exothermic and, when the reaction temperature is too high, a competing reaction sets in with the elimination of hydrogen halide from the halogenalcohol leading to the formation of an epoxy group of an undersirable magnitude. In view of this, it may be necessary to cool the reaction mixture, so as to prevent a reaction temperature of 40° C., advantageously of 30 to 35° C., being exceeded. In certain cases, it may be advantageous to use an inert solvent.

The resulting β-cyanoethyl-halogenoalkyl ethers can be isolated without difficulty, if desired after the alkali metal hydroxide has been neutralized with an aqueous mineral acid. The processing is especially easy when solid alkali metal hydroxide has been used for the addition reaction. In this case the ether formed can be simply filtered off from the alkali metal hydroxide. Distillation yields the cyanoethyl-halogenoalkyl ether in excellent purity.

In the following example, which illustrates the invention, parts and percentages are by weight unless otherwise indicated.

*Example*

12.5 parts of caustic soda were stirred in portions into 162 parts of ethylenechlorohydrin and 106 parts of ethylenechlorohydrin and 106 part of acrylonitrile. During the addition, the batch was cooled to maintain the reaction temperature at 30° C. On completion of the addition, the whole was stirred for 3 hours at 40° C., freed from insoluble matter by filtration, and distilled, to yield 193 parts (=73% of the theoretical yield) of β-chloro-β'-cyanodiethyl ether, boiling at 106 to 110° C. under 7 mm. Hg pressure in 99.4% purity.

When the caustic soda was replaced by an equivalent amount of caustic potash, simular results were obtained.

What is claimed is:

1. A process for the manufacture of β-cyanoethyl chloroalkyl ethers, which comprises reacting a chloroalcohol of the formulae ClCH₂CH₂OH

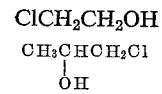

or

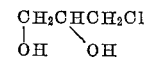

with acrylonitrile at a temperature of at most 40° C. in the presence of a solid alkali metal hydroxide, the amount of alkali metal hydroxide used per mol of the chloroalcohol being at least 0.05 mol.

2. A process as claimed in claim 1, wherein approximately equimolecular proportions of the chloroalcohol and of acrylonitrile are used.

3. A process as claimed in claim 1, wherein ethylenechlorohydrin is used.

4. A process as claimed in claim 1, wherein the solid alkali metal hydroxide is used in an amount of at least 0.15 mol per mol of the chloroalcohol.

5. A process as claimed in claim 1, wherein the alkali metal hydroxide used in sodium hydroxide.

6. A process as claimed in claim 1, wherein during the reaction the temperature is maintained at 30° to 35° C.

References Cited by the Examiner

UNITED STATES PATENTS 2,280,792  4/1942  Bruson _____ 260—465.6 XR

FOREIGN PATENTS 743,224  12/1943  Germany.

OTHER REFERENCES

Bruson: "Organic Reactions," vol. 5, pp. 89 and 92, 1949.

CHARLES B. PARKER, *Primary Examiner.*
JOSEPH P. BRUST, *Examiner.*